United States Patent

Spiess et al.

[11] Patent Number: 5,971,876
[45] Date of Patent: Oct. 26, 1999

[54] HYDRAULIC EMERGENCY CONTROL FOR CHANGING HYDRAULIC OIL PRESSURE IN THE HYDRAULIC CONICAL PULLEY AXIAL ADJUSTMENT MECHANISM OF A CONTINUOUSLY VARIABLE TRANSMISSION FOR VARYING THE CLAMPING FORCE RATIO

[75] Inventors: Ewald Spiess, Vaihingen/Enz; Hans Haecker, Sachsenheim; Joachim Luh, Bietigheim-Bissingen; Peter Baeuerle, Ludwigsburg, all of Germany; Riné Pelders, Nuland; Wilhelmus J. M. van Wijk, An Udenhout, both of Netherlands

[73] Assignees: Robert Bosch GmbH, Stuttgart, Germany; Van Doorne's Transmissie B.V., Tilburg, Netherlands

[21] Appl. No.: 08/952,092
[22] PCT Filed: May 9, 1996
[86] PCT No.: PCT/EP96/01946
§ 371 Date: Nov. 4, 1997
§ 102(e) Date: Nov. 4, 1997
[87] PCT Pub. No.: WO96/37716
PCT Pub. Date: Nov. 28, 1996

[30] Foreign Application Priority Data
May 24, 1995 [DE] Germany .......................... 195 19 163

[51] Int. Cl.$^6$ ............................ F16H 59/00; B60K 41/12
[52] U.S. Cl. .................................. 474/28; 474/18; 477/48
[58] Field of Search .................................. 474/18, 12, 28, 474/32; 60/403, 400; 477/48, 46, 49, 45

[56] References Cited

U.S. PATENT DOCUMENTS

| | | | |
|---|---|---|---|
| 4,663,991 | 5/1987 | Nakamura et al. | 474/28 |
| 4,672,864 | 6/1987 | Morimoto | 474/28 X |
| 4,685,357 | 8/1987 | Sawada et al. | 477/48 |
| 4,702,725 | 10/1987 | Kouno et al. | 474/28 |
| 5,085,107 | 2/1992 | Tatara | 474/12 X |

*Primary Examiner*—Tamara L. Graysay
*Assistant Examiner*—Marcus Charles
*Attorney, Agent, or Firm*—Michael J. Striker

[57] ABSTRACT

A hydraulic emergency control for changing the hydraulic oil pressure in the hydraulic conical pulley axial adjustment mechanism of a continuously variable transmission (10) for varying the clamping force ratio has a pump (20) in an open hydraulic circuit that supplies the respective piston chambers (17, 13) of the secondary and primary axial adjustment mechanisms with hydraulic oil. The primary and secondary oil pressures are regulated by separate oil pressure limiting valves (30, 40). At least one throttle valve (51) is arranged between the pump (20) and the output pipe (92) of the open hydraulic circuit, at a point where the pump volumetric flow can be influenced. The hydraulic emergency control allows a starting transmission ratio to be set in a low range when starting the vehicle, whereas a very small reduction ratio is selected at a high driving speed and at light throttle.

16 Claims, 7 Drawing Sheets

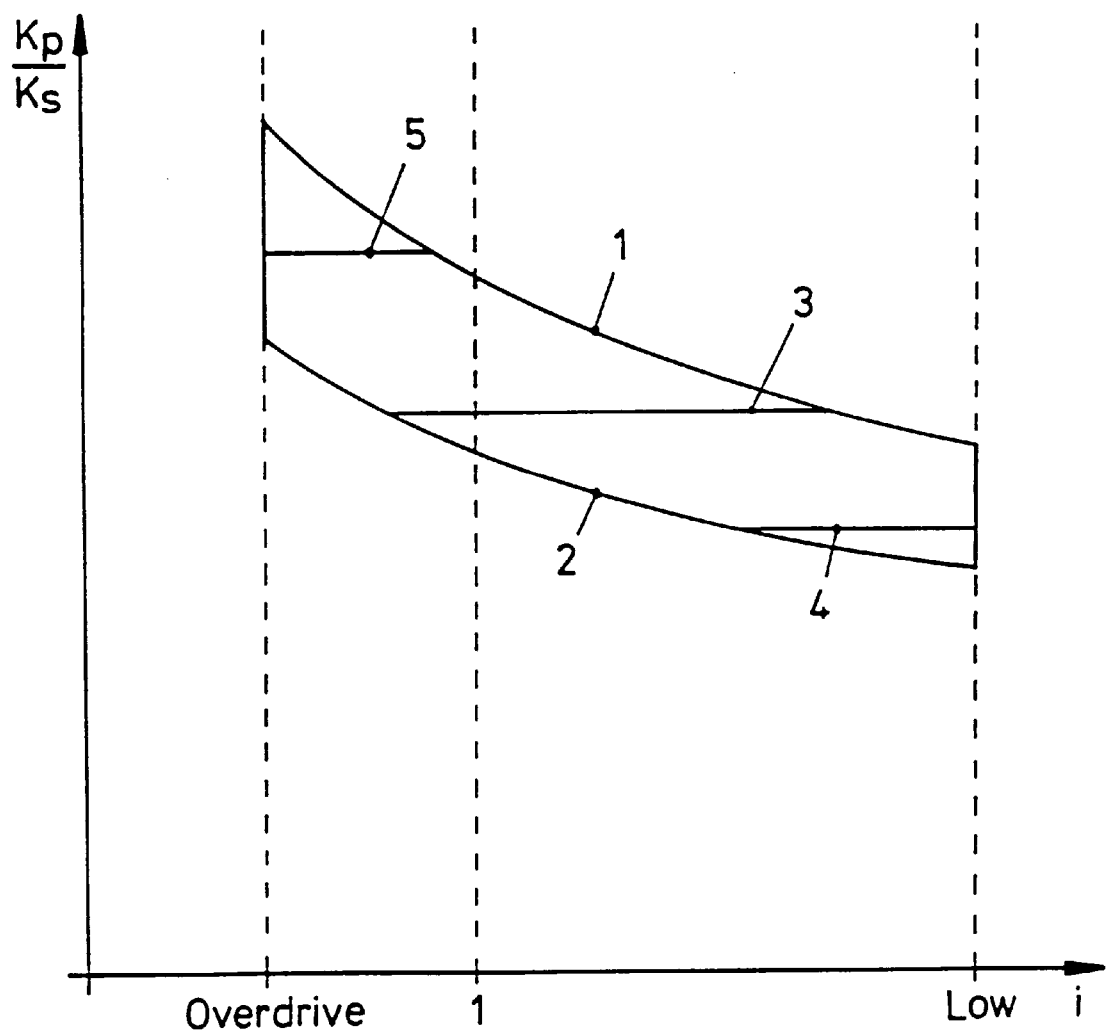
Figur 1

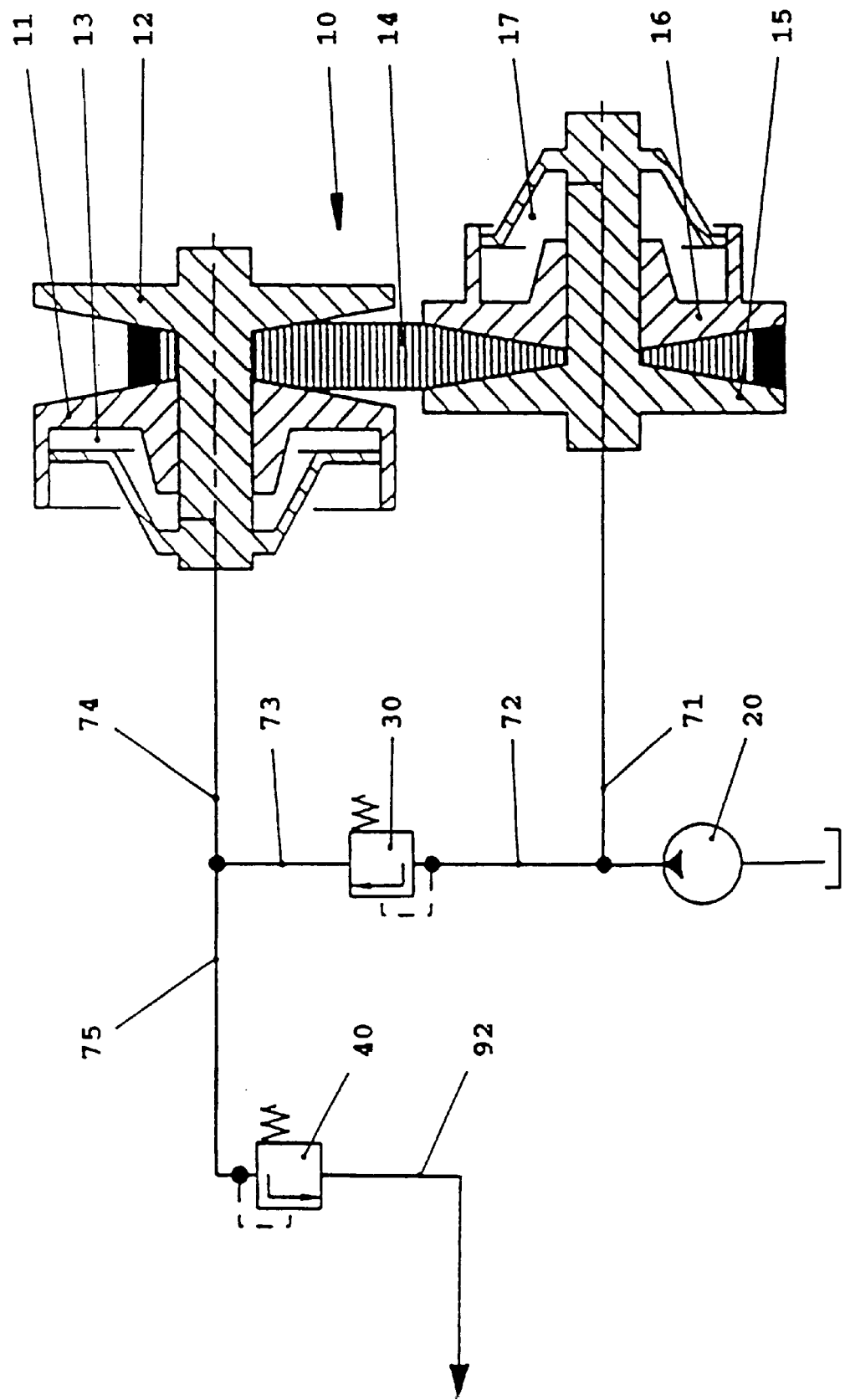
Figur 2

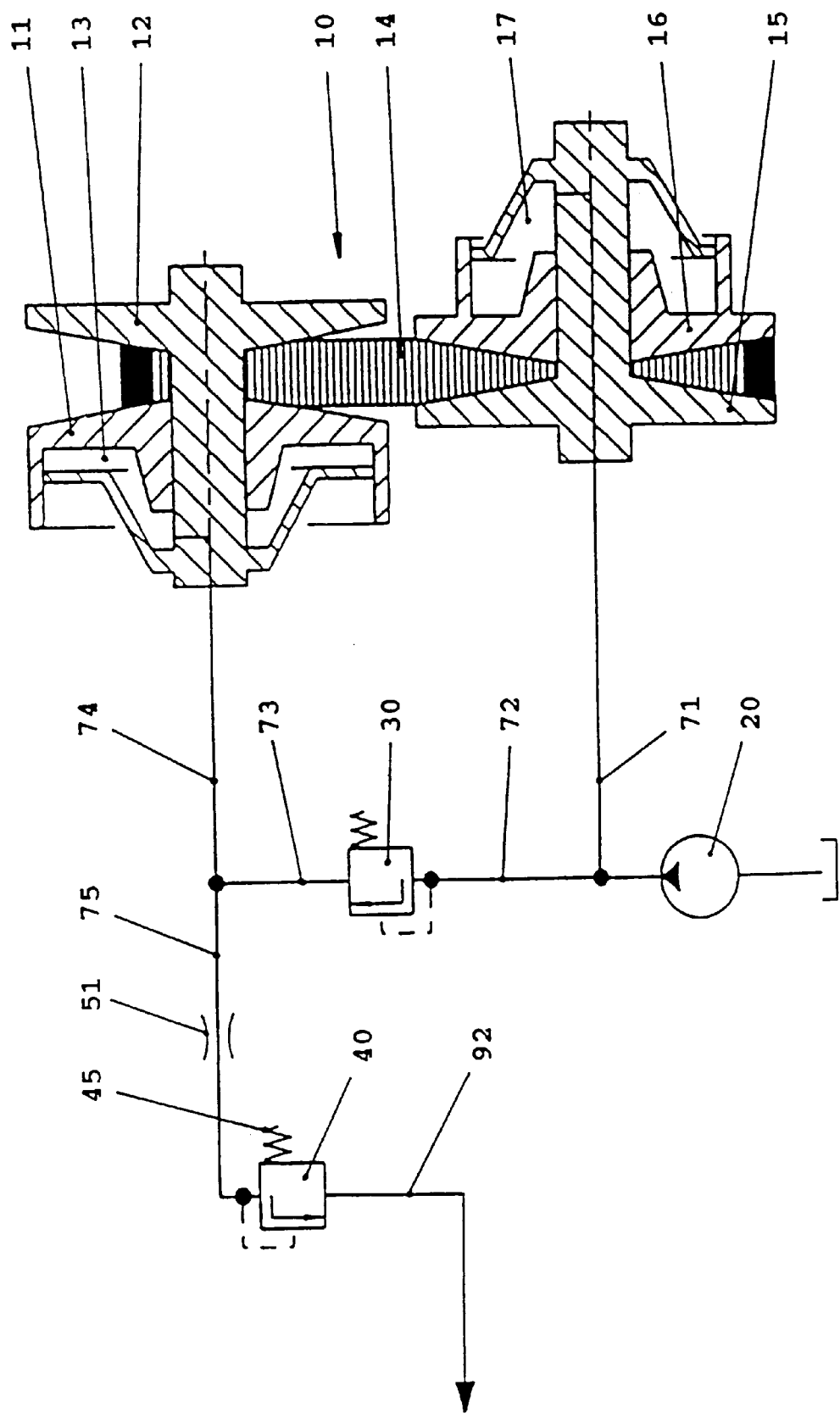
Figur 3

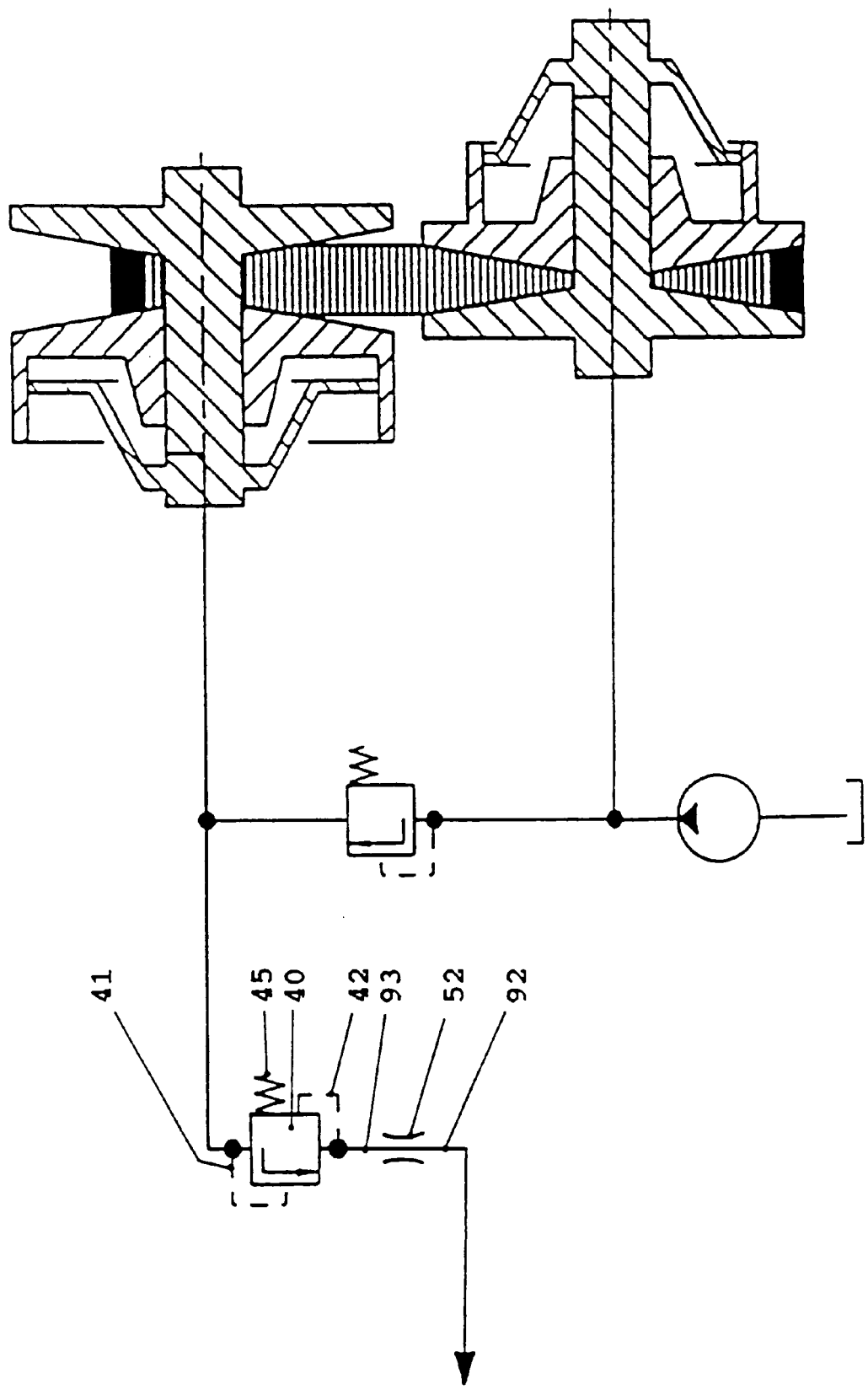
Figur 4

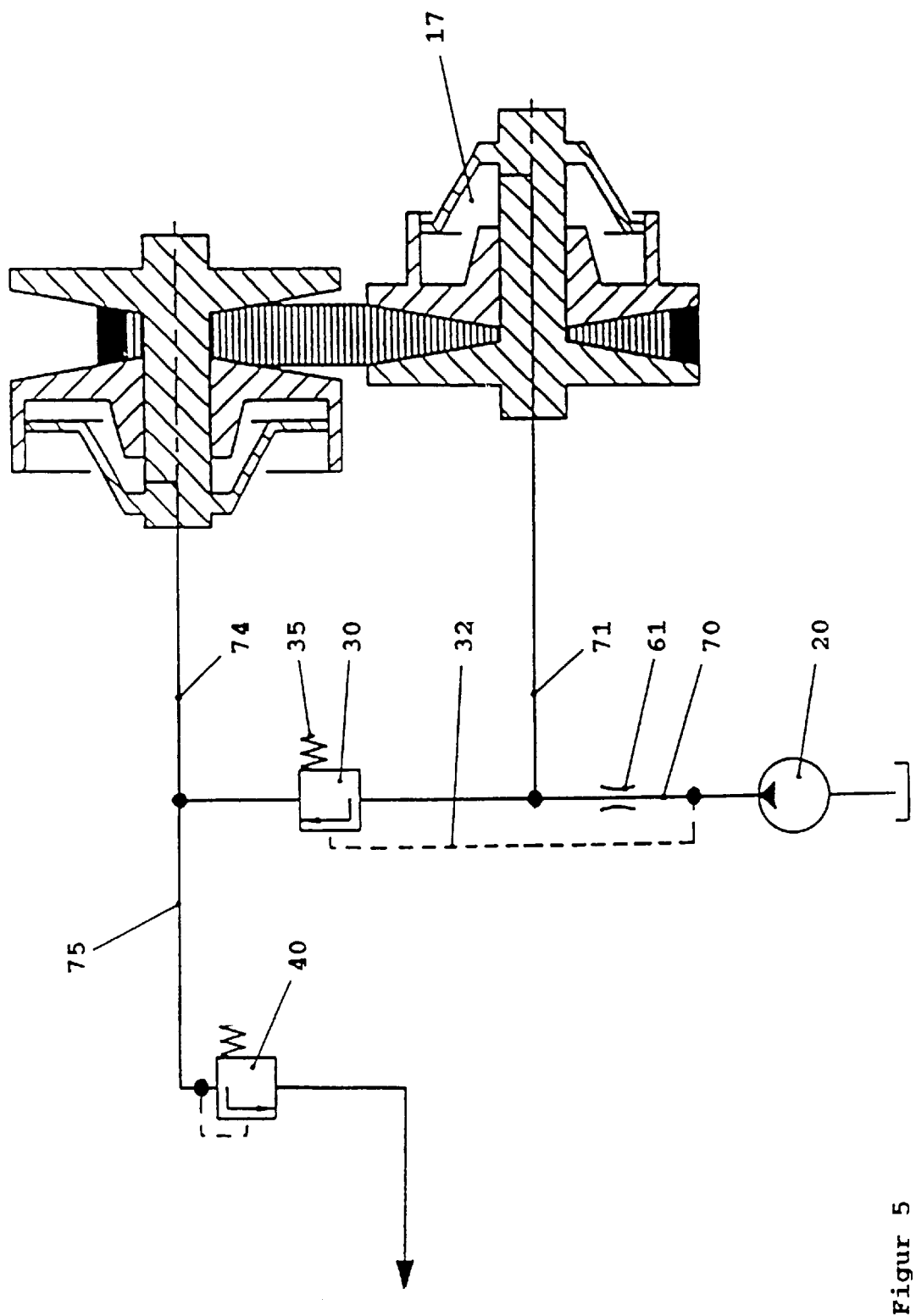
Figur 5

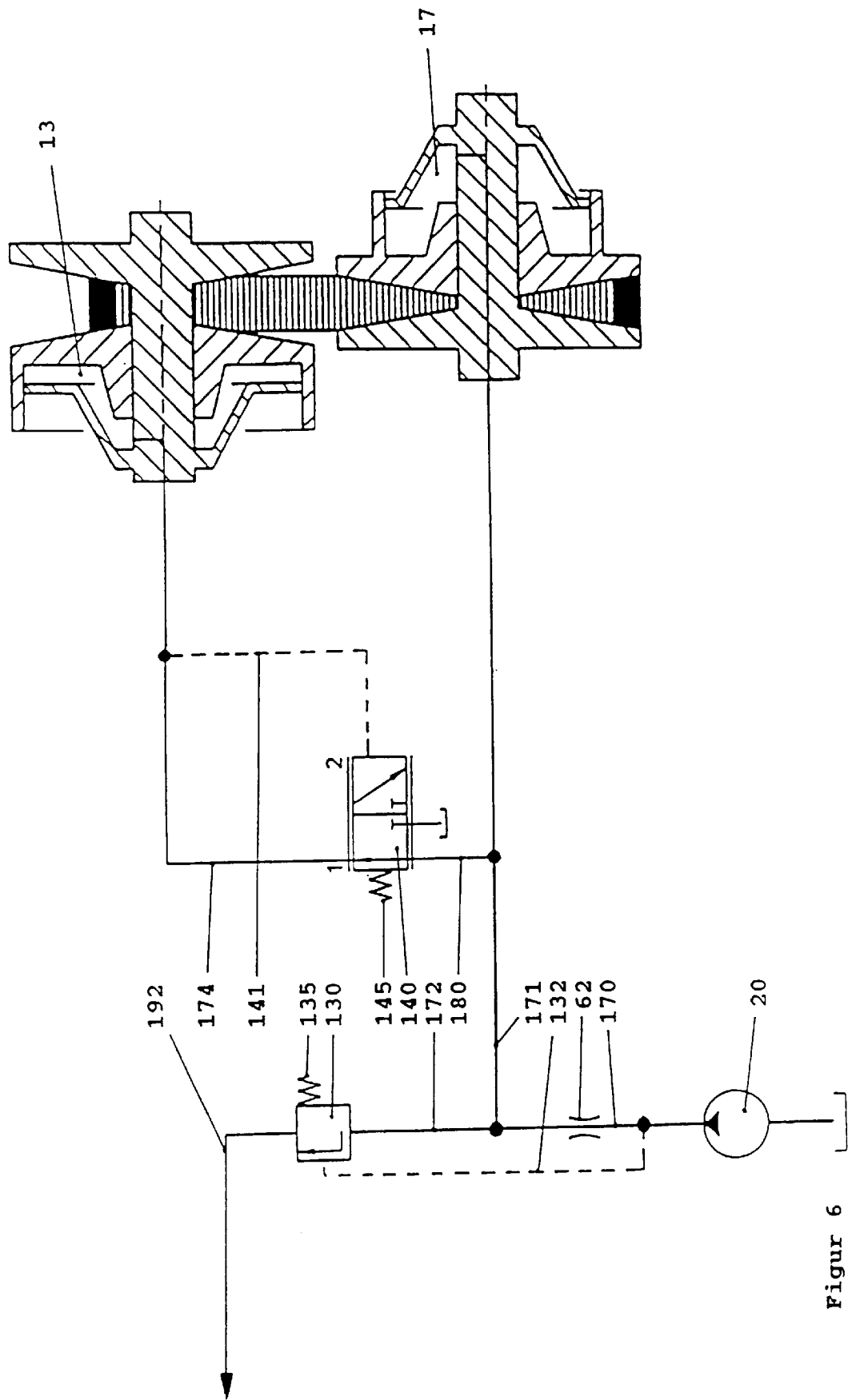
Figur 6

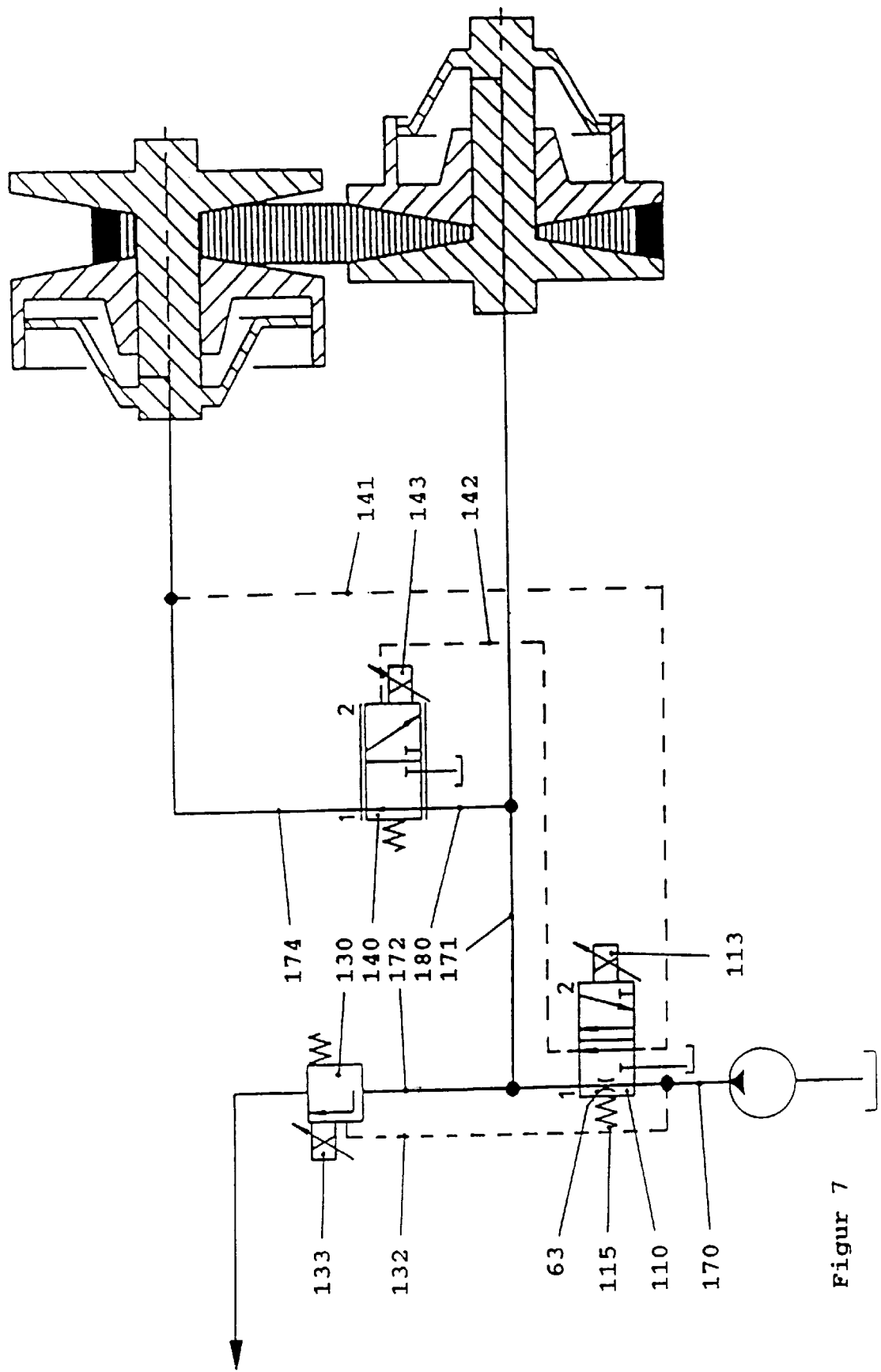
Figur 7

5,971,876

HYDRAULIC EMERGENCY CONTROL FOR CHANGING HYDRAULIC OIL PRESSURE IN THE HYDRAULIC CONICAL PULLEY AXIAL ADJUSTMENT MECHANISM OF A CONTINUOUSLY VARIABLE TRANSMISSION FOR VARYING THE CLAMPING FORCE RATIO

BACKGROUND OF THE INVENTION

The invention relates to a hydraulic emergency control.

A hydraulic emergency control for an electronically controlled, continuously variable transmission (continuously variable transmission, CVT) is described in DE-42 34 103 A1. The CVT transmission which is preferably employed in motor vehicles, has a control for emergency driving operations which, when the electrical control of normal driving operations fails, causes a switching position with a high gear ratio in order to provide more advantageous restart and start-up conditions. Among other things, the ratio of primary to secondary clamping force between the pulling means and the pairs of beveled disks is maintained constant by means of this control through an intermediate gear range. In the intermediate gear range the gear ratio changes as a function of the torque requirements of the power take-off shaft. With a high demand a high gear ratio is selected, while a low gear ratio is set with a low demand. The means required for this are recited in the description of FIGS. 1 and 2.

SUMMARY OF THE INVENTION

The hydraulic emergency control in accordance with the invention is needed in order to be able to utilize a continuously transmitting looped gear without the aid of an electrohydraulic actuator, which is active in normal driving operations, over the entire gear range. It is intended by means of the hydraulic emergency control to set a start-up gear ratio in the low range when a vehicle is started, for example to allow a start up on a hill or out of an underground garage. The emergency control is also intended to set a gear ratio in the overdrive range at high driving speeds and low engine torque. A benefit of this is for one, that the maximum speed can also be attained in an emergency driving operation and, for another, overspeeding of the engine when the electronic actuator fails under maximum speed is prevented.

With the hydraulic emergency control in accordance with the invention, the clamping force ratio is varied as a function of the conveyed pump volume flow or the engine rpm. To this end at least one flow control valve is arranged in an open hydraulic circuit for supplying the respective piston chambers of the secondary and primary axial adjustment devices. Viewed in the flow direction of the pressure medium, the individual flow control valve is located at a place where the pump volume flow is affected between the hydraulic pump—which for example is driven by the vehicle engine—and the outlet from this open hydraulic circuit. The volume flow-dependent pressure change, which results at the respective flow control valve, changes the contact pressure in the corresponding pair of beveled disks.

Flow control valves are provided, with whose aid the primary clamping force is changed, while the flow control valves vary the clamping force in the secondary disk set.

Among other things, the remaining claims describe individual special arrangements for the flow control valves in connection with the pressure limiting valves and other control flow valves.

BRIEF DESCRIPTION OF THE DRAWINGS

Several exemplary embodiments of the invention, besides the prior art, are schematically represented in the drawings in the form of hydraulic circuit diagrams and will be explained in more detail in the following drawing description also with the aid of a simplified or ideally represented diagram. Shown are in:

FIG. 1, a clamping force ratio diagram,

FIG. 2, a hydraulic circuit diagram for a rigid setting of a preselected clamping force ratio, FIG. 3, a hydraulic circuit diagram for a variable setting of the clamping force conditions by raising the primary pressure, FIG. 4, a hydraulic circuit diagram as in FIG. 3 with a flow control valve in the outlet area, FIG. 5, a hydraulic circuit diagram for a variable setting of the clamping force conditions by lowering the secondary pressure, FIG. 6, a hydraulic circuit diagram as in FIG. 5 with a separate flow control valve in the primary line and, FIG. 7, a hydraulic circuit diagram as in FIG. 6 with electrical switching from the normal driving operation to emergency driving operation.

DESCRIPTION OF THE PREFERRED EMBODIMENTS

FIG. 2 shows a detail of a hydraulic circuit diagram, corresponding to the prior art, for controlling the hydraulic fluid pressures of the pressure cylinders on the drive and driven sides of a continuously transmitting looped gear. The known continuously transmitting looped gear (10) includes two pairs of beveled disks between which a transfer means (14), such as a thrust link belt, a chain, a V-belt or the like, is disposed. Both pairs of beveled disks respectively consist of two beveled disks (11, 12; 15, 16), which are embodied so that they can be hydraulically braced against one another. The piston and cylinder parts required for this purpose are preferably integrated with at least one part of the beveled disks. The piston chambers enclosed by these parts are the piston chamber (13) on the primary side, and on the secondary side the piston chamber (17). They are acted upon in accordance with the gear ratio to be established with the operating pressure required for this.

FIG. 1 contains a diagram in which the ratio of the clamping force $K_p$ of the primary cylinder and the clamping force $K_s$ of the secondary cylinder over the gear ratio i of the looped gear has been schematically plotted. The gear ratio has been plotted on the abscissa of the diagram rising toward the right. As a rule, the maximum gear ratio, indicated by "low", is used for starting the vehicle up, while the minimum gear ratio, indicated by "overdrive", corresponds to the highest gear. The upper curve 1 spanning the entire gear range, indicates the clamping force conditions required for transmitting the torque at full load operation. The lower curve 2, which also spans the entire gear range, indicates the clamping force conditions required for a torque of almost zero to be transmitted.

For obtaining the required clamping forces at the pairs of beveled disks (11, 12) and (15, 16), a known hydraulic circuit represented in FIG. 2 is used, for example. On the one hand a pump (20) directly supplies the piston chamber (17) on the secondary side via a secondary line (71). On the other hand, with the interposition of a pressure control valve (30) it conveys hydraulic fluid via the lines (72) and (73) into the primary line (74), through which the primary piston chamber (13) is supplied. A continuing line (75) branches off at the connecting point between the lines (73) and (74), which makes a transition via a further pressure control valve (40)

into the outgoing line (92). The entire amount conveyed by the pump and not required for the beveled disk displacement flows through the two pressure control valves (30) and (40) at a relatively low pressure into the line (92), from where it is available for other gear functions, such as clutch actuation and lubrication. The pressure from the pump (20) or the secondary line (71) to the line (92) is reduced in steps by means of the pressure control valves (30) and (40), because of which a constant clamping force ratio $K_p/K_s$ in accordance with the horizontal line 3 results in the diagram of FIG. 1. In this case "$K_p$" is the clamping force on the primary side, while "$K_s$" represents the clamping force on the secondary side. Therefore a ratio change in accordance with the course of the line 3 is only possible to a limited degree. If, for example, the gear input torque is raised from zero to the maximum value, the gear ratio is changed from almost "overdrive" to a ratio near "low".

The lines, valves and flow control points are represented in relation to the piston chambers on the primary and secondary side in the exemplary embodiments shown. It is of course also conceivable to interchange the secondary side with the primary side.

Individual hydraulic circuits are represented in FIGS. 3 to 7, with whose aid the clamping force conditions can be changed in such a way that the entire transmission range can also be used in emergency driving operations. To this end at least one flow control valve (51, 52; 61 to 63) has been installed or switched in between the pump (20) and the continuing line (92), through which the clamping force ratio $K_p/K_s$ is changed as a function of the engine rpm. As a prerequisite for this it is necessary that the amount conveyed by the pump (20) steadily increases with increasing engine rpm. The pressure drop p at the flow control point, which is a function of the volume flow, is then calculated by means of the Hagen-Poiseuille Law (1) or, following transformation, from the equation (2):

$$Q = \alpha \cdot A \cdot (2(p_1-p_2)/o)^{1/2} \quad (1)$$

$$p = p_1 - p_2 = (o \cdot Q^2)/(2\alpha^2 \cdot A^2) \quad (2)$$

with

α: Flow-through coefficient
A: Cross-section flow control surface
o: Hydraulic fluid density
Q: Volume flow
$p_1$, $p_2$: Pressure upstream and downstream of the flow control valve The pressure rise p is used to either raise the primary clamping force $K_p$ as a function of the amount conveyed by the pump or to correspondingly lower the secondary clamping force $K_s$, or to raise the primary clamping force $K_p$ and to lower the secondary clamping force $K_s$. As a result of this, a clamping force ratio $K_p/K_s$ occurs at low engine rpm which lies on the level of the line 4 in the diagram of FIG. 1. By means of this a gear ratio in the low range is already set when starting up. With high engine rpm a clamping force ratio at the level of the line 5 occurs, so that gear ratios in the entire overdrive range are possible.

A first variant for varying the clamping force ratio $K_p/K_s$ is represented in FIG. 3. In contrast to the known hydraulic circuit diagram in FIG. 2, a flow control valve (51) is arranged in the line (7) in FIG. 3. By means of this flow control valve the limit pressure set on the primary side by means of the pressure control valve (40) is additionally raised by p, which is a function of the pump volume flow or of the engine rpm. The flow control valve (51) can also be equipped with a variable flow control cross section. The rising characteristic line of the regulating spring (45) of the pressure control valve (40) can also lead to a pressure increase with an increasing opening cross section.

In FIG. 4 a flow control valve (52) is arranged in the outgoing line (92). The pressure on the outflow side in the line section (93) located between the pressure control valve (40) and the flow control valve (52) is returned via a control line (42) to the pressure control valve (40) and acts parallel in respect to the regulating spring (45). The spring ratio of the regulating spring (45) is designed to be sufficiently low so that it is possible to start up at a relatively low clamping force ratio, see line 4 in the diagram in FIG. 1. The sum of the spring force of the regulating spring (45) and of the product of the pressure in the control line (42) and the corresponding piston or slider surface in the pressure control valve (40) causes a rise in the clamping force ratio to the line 5 with increasing engine rpm by means of the changing of the valve (40).

A lowering of the secondary pressure in the piston chamber (17) is caused by means of the hydraulic circuit diagram in FIG. 5. To this end a flow control valve (61) is arranged in the line (70) between the pump (20) and the branch of the secondary line (71). The pressure control valve (30) seated downstream of the branch is controlled on its side located opposite the regulating spring (35) by a control line (32), which taps the pressure from the line (70) between the pump (20) and the flow control valve (61). With this variant it is possible to integrate a further flow control valve into the line (75). By means of this the dependency on the engine rpm of the pressure in the piston chamber (13) on the primary side is increased.

A further variation of the secondary pressure reduction is represented in FIGS. 6 and 7. With the circuit for emergency driving operations represented in FIG. 6, the pump (20) first supplies the piston chamber (17) on the secondary side via a flow control valve (62), integrated into the line (170), and via the line (171). A line (180), in which a flow control valve (140) is arranged, branches off the line (180). A line (174) leads from the valve (140) to the piston chamber (13) on the primary side. The valve (140) is a continuously throttling 3/2-way valve with a spring reset on the left side and a control line (141) connected to the right side. The latter is connected to the primary line (174).

A line (172) leading via a pressure control valve (130) into a line (192) branches off between the lines (170) and (171). The pressure control valve (130) is supplied from the line (170) via a control line (132). Here, the control line is connected between the pump (20) and the flow control valve (62). The pressure control valve (130) directly lowers the secondary pressure in the line (172) to a lower intermediate pressure level in the line (192).

The primary pressure is set by means of the flow control valve (140). With low primary pressure in the piston chamber (13), the restoring spring (145) maintains the slider of the flow control valves (140) in the position 1, so that the secondary line (171) is connected via the line (180) with the primary line (174). But with high pressure in the piston chamber (13) hydraulic fluid flows via the control line (141) to the flow control valve (140) and moves its slider in the opposite direction, i.e. into the position 2. Now hydraulic fluid coming from the piston chamber (13) flows off into the reservoir.

The circuit principle for emergency driving operations in FIG. 6 is again represented in FIG. 7. However, additional means are provided in FIG. 7, which permit the switching from normal driving operations to emergency driving operations. To this end a 5/2-way valve (110) has been installed in the line (170) between the branch for the control line (132) of the pressure control valve (130) and the branch of the secondary line (171). On its one side, the 5/2-way valve (110) has a restoring spring, and on its other side an electromagnetic actuator (113) which can be adjusted, if necessary. In its switching position 1, which the valve takes up during emergency driving operations, for example in case of an outage of the electrical actuator, on the one hand the pressure medium flow from the line (170) to the line (172) is controlled by means of the flow control point (63) integrated into the directionl control valve. On the other hand, the control line (141) branching off the primary line (174) is connected with the control line (142) for the flow control valve (140). The fifth connection on the flow control valve (140) leads back to the reservoir.

During normal driving operations, the 5/2-way valve (110) takes up the position 2. By means of this the line (170) is switched to uncontrolled flow, the control line (141) is blocked and the control line (142) is relieved into the reservoir.

Furthermore, the pressure control valve (130) is equipped with an electrical actuator (133), adjustable for example. The latter is provided with current during normal driving operations, by means of which the pressure in the line (172) located upstream of the pressure control valve (130) is regulated to a pressure level required for normal driving operations.

The flow control valve (140) is also equipped with an electromagnetic actuator (143), adjustable for example. Depending on the size of the current in the actuator (143), the flow control valve (140) is in the switching position 1 or 2. In the switching position 1 the line (180) branching off the secondary line (171) is connected with the primary line (174). In the switching position 2 the primary line (174) is relieved into the reservoir and the line (180) is blocked. Here, too, current supply to the actuator (143) is only provided during normal driving operations.

The electrical valve actuators can also be replaced by hydraulic pilot valves or other similarly acting means.

We claim:

1. A hydraulic emergency control for changing hydraulic pressures in hydraulic beveled disk axial displacement device of a continuously transmitting looped gear for varying clamping forces, the hydraulic emergency control comprising an open hydraulic circuit having a line which constitutes an outlet; a pump provided in said open hydraulic circuit and supplying respective piston chambers of secondary and primary axial adjusting devices with hydraulic fluid; separate valves for controlling primary and secondary fluid pressure; and at least one flow control valve arranged at a location where it affects a pump volume flow between said pump and said line constituting an outlet of said open hydraulic circuit through which the hydraulic fluid leaves said open hydraulic circuit.

2. A hydraulic emergency control as defined in claim 1, wherein said at least one flow control valve is arranged between a primary line leading to a piston chamber and a pressure control valve.

3. A hydraulic emergency control as defined in claim 1; and further comprising a second valve formed as a differential pressure regulator; and a flow control valve arranged downstream of said second valve, said second valve having a second control line connected to a line section located between said second valve and said flow control valve.

4. A hydraulic emergency control as defined in claim 1; and further comprising a first pressure control valve; and a flow control valve arranged in a direction of flow upstream of a secondary line leading to a secondary axial adjusting device and upstream of said first pressure control valve, said pressure control valve having a control line connected upstream of said flow control valve.

5. A hydraulic emergency control as defined in claim 4; and further comprising a primary line branching off said secondary line; and a continuously throtting pressure control valve having a pressure reducing function and arranged in said primary line.

6. A hydraulic emergency control as defined in claim 4; and further comprising a further line arranged downstream of said first pressure control valve.

7. A hydraulic emergency control as defined in claim 4; and further comprising a primary line leading to a piston chamber, and a further line leading to a pressure control valve, said primary line and said further line being connected downstream of said first pressure control valve; and a further control valve integrated in said further line.

8. A hydraulic emergency control as defined in claim 1; and further comprising an actuating device arranged in at least a portion of the valves for controlling the fluid pressure, so that the valves for controlling the fluid pressure are switchable to passage or a preselected pressure limitation when making a switching from an emergency driving operation to a normal driving operation.

9. A hydraulic emergency control as defined in claim 8, wherein said actuating device is an electromagnetic actuating device.

10. A hydraulic emergency control as defined in claim 8, wherein said actuating device is a hydraulic actuating device.

11. A hydraulic emergency control as defined in claim 1; and further comprising an actuating device; a directional control valve having a flow control point which is actuatable by said actuating device so that during an emergency driving operation said directional control valves control a flow volume through a line and which switches a control fluid flow through control lines to passage, while during a normal driving operation said flow control point opens the line, disconnects one of the control lines from another of the control lines, and relieves the other control line in a direction of a reservoir.

12. A hydraulic emergency control as defined in claim 4, wherein said first pressure control valve is provided with an electromagnetic actuating device.

13. A hydraulic emergency control as defined in claim 5, wherein said continuously throttling pressure control valve is provided with an electromagnetic actuating device.

14. A hydraulic emergency control as defined in claim 1, wherein said at least one flow control valve has a variable cross-sectional surface.

15. A hydraulic emergency control as defined in claim 1, wherein said valves for controlling the fluid pressure are provided with regulating and restoring spring which is variable.

16. A hydraulic emergency control as defined in claim 15, wherein said regulating and restoring spring has at least partially non-linear characteristic curve.

* * * * *